United States Patent
Zamani et al.

(10) Patent No.: US 12,374,746 B2
(45) Date of Patent: Jul. 29, 2025

(54) ELASTIC SUPPORT HAVING NANOTUBE SPRINGS FOR LITHIUM-ION BATTERIES

(71) Applicant: NISSAN NORTH AMERICA, INC., Franklin, TN (US)

(72) Inventors: Somayeh Zamani, Novi, MI (US); Nanzhu Zhao, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 558 days.

(21) Appl. No.: 17/877,877

(22) Filed: Jul. 29, 2022

(65) Prior Publication Data
US 2024/0039099 A1   Feb. 1, 2024

(51) Int. Cl.
*H01M 50/242* (2021.01)
*H01M 50/293* (2021.01)

(52) U.S. Cl.
CPC ....... *H01M 50/242* (2021.01); *H01M 50/293* (2021.01)

(58) Field of Classification Search
CPC .......................... H01M 50/242; H01M 50/293
USPC ......................................................... 429/208
See application file for complete search history.

(56) References Cited

U.S. PATENT DOCUMENTS

| | | | |
|---|---|---|---|
| 8,785,914 B2 | 7/2014 | Choi et al. | |
| 9,787,221 B2 | 10/2017 | Kim et al. | |
| 9,917,335 B2 | 3/2018 | Jarvis et al. | |
| 10,541,358 B2 | 1/2020 | Park et al. | |
| 10,581,082 B2 * | 3/2020 | Schauer | H01G 11/24 |
| 11,283,003 B2 | 3/2022 | Sadr | |
| 2011/0183206 A1 | 7/2011 | Davis et al. | |
| 2020/0091566 A1 | 3/2020 | Jeong et al. | |

FOREIGN PATENT DOCUMENTS

| | | |
|---|---|---|
| JP | 2019-140022 A | 8/2019 |
| JP | 2021-073670 A | 5/2021 |
| WO | 2020165270 A1 | 8/2020 |

OTHER PUBLICATIONS

Zhang et al. Flexible and Stretchable Lithium-Ion Batteries . . . Based on Electrically Conducting Carbon Nanotube Fiber Springs. Angew. Chem. Int. Ed. vol. 53, 2014, pp. 14564-14568. Retrieved from https://onlinelibrary.wiley.com/doi/full/10.1002/anie201409366 (Year: 2014).*

Fraternali et al. Multiscale mass-spring models of carbon nanotube foams. Journal of the Mechanics and Physics of Solids, vol. 59, 2011, pp. 89-102. Retrieved from https://www.sciencedirect.com/science/article/pii/S0022509610001808 (Year: 2011).*

* cited by examiner

*Primary Examiner* — James M Erwin
(74) *Attorney, Agent, or Firm* — Global IP Counselors, LLP

(57) ABSTRACT

A battery is provided that includes a cathode current collector, a cathode, a solid electrolyte, an anode current collector and an elastic support. The elastic support is provided on at least one of the cathode current collector and the anode current collector. The elastic support comprises an elastic polymer and nanotube springs provided within the elastic polymer.

20 Claims, 6 Drawing Sheets

ELASTIC SUPPORT HAVING NANOTUBE SPRINGS FOR LITHIUM-ION BATTERIES

BACKGROUND

Field of the Invention

The present invention generally relates to an elastic support having nanotube springs for a solid-state-lithium-ion battery, and a lithium-ion battery. The battery includes a cathode current collector, a cathode, a solid electrolyte, an anode current collector and an elastic support. The elastic support is provided on at least one of the cathode current collector and the anode current collector. The elastic support comprises an elastic polymer and nanotube springs provided within the elastic polymer.

Background Information

Lithium-based batteries that include lithium metal anodes or lithium-based cathode material are desirable because they have a high energy density and, thus, can generate a large amount of power with a relatively thin electrode structure, thus permitting a reduction in the size of the battery as compared with other conventional batteries including anodes made of carbon or silicon.

With respect to solid-state lithium-ion batteries, it has been discovered that anode-free solid-state batteries, in which a bare anode current collector is used and a lithium metal anode is formed on the current collector during charging of the battery, have the highest energy density and are therefore the most desirable. For example, conventional anode-free lithium-based solid-state batteries use a cathode formed of a lithium-ion material, such as lithium nickel manganese cobalt oxide ($LiNiMnCoO_2$, also commonly referred to as "NMC"), mixed with solid electrolyte, and a bare anode current collector. In such anode-free batteries, there is no lithium present initially—instead, the lithium metal anode is formed by precipitation from the intercalated lithium in the cathode active material. However, one problem with these conventional anode-free batteries is that they typically have an approximately 30 µm change in expansion or thickness during charging due to formation of the anode. This change in expansion can cause contact issues between the battery layers, thereby reducing the cycle life of the battery. Some conventional anode-free batteries have attempted to use high pressure to reduce the change in expansion. Alternatively, other anode-free batteries have included a protective polymer layer between the anode and the solid electrolyte layer.

However, there are several drawbacks with conventional protective polymer layers for anode-free lithium-ion solid-state batteries. For example, the polymer material can reduce the conductivity of the electrode materials and undesirably react with the solid electrolyte material. Furthermore, addition of the polymer material between the active material layers can reduce the energy density of the battery. The protective polymer layer also fails to sufficiently accommodate the change in expansion of the battery when the anode is formed.

Therefore, further improvement is needed to sufficiently accommodate the change in expansion of anode-free solid-state batteries during charging. In particular, it is desirable to compensate for the expansion and pressure increase in the battery during charging and thereby prevent any contact issues between the layers after the discharge step when the anode layer goes away.

SUMMARY

It has been discovered that the change in expansion and pressure increase in the anode-free battery due to formation of the anode during charging can be compensated for by providing an elastic support including nanotube springs on a surface of one or both of the electrode current collectors. The elastic support can be provided on one or both of the electrode current collectors such that the elastic support faces the inside or outside of the battery. The elastic support includes a plurality of conductive nanotube springs embedded within an elastic polymer layer. By providing the elastic support on the interior of the battery such that it faces the solid electrolyte, the conductive nanotube springs can provide the necessary conductivity and integrity between the current collector(s) and the electrode active material(s). Alternatively, by providing the elastic support on the exterior of the battery such that it faces the outside of the battery, the polymer layer does not interfere with the active material or react with the solid electrolyte inside the battery.

Furthermore, by providing nanotube springs within the elastic polymer layer, the nanotube springs can be contracted or compressed and the elastic polymer layer can become softer to accommodate the change in expansion and pressure when the anode layer is formed during charging. In addition, because the nanotube springs and elastic polymer layer can be decompressed and expand again when the anode layer goes away during discharging, issues with contact between the layers of the battery after discharge can be prevented.

The conductive nanotube springs can also beneficially conduct electricity from one side of the elastic polymer layer to the other. When the elastic support is provided on the interior of the battery, the battery itself can provide electricity to the springs and lengthen the springs, thereby causing the polymer elastic layer to become thicker. This is a piezoelectric effect. On the other hand, when the elastic support is provided on the exterior of the battery, an external source outside of the battery itself can provide electricity to the springs and lengthen the springs, thereby causing the elastic polymer layer to become thicker. This is also a piezoelectric effect.

Therefore, it is desirable to provide a lithium-ion battery, such as an anode-free solid-state battery, that includes such an elastic support in which nanotube springs are embedded within an elastic polymer layer.

In view of the state of the known technology, one aspect of the present disclosure is to provide a battery including an elastic support with nanotube springs. The battery includes a cathode current collector, a cathode, a solid electrolyte, an anode current collector and an elastic support. The elastic support is provided on at least one of the cathode current collector and the anode current collector. The elastic support comprises an elastic polymer and nanotube springs provided within the elastic polymer. The cathode includes a catholyte material and cathode active material particles. The cathode active material particles include an electrically conductive core and a cathode active material. The electrically conductive core is formed of an electrically conductive material, and the cathode active material is disposed on a surface of the electrically conductive core.

Another aspect of the present disclosure is to provide an elastic support that can accommodate the change in expansion of an anode-free solid-state battery when the lithium anode is formed. The elastic support includes an elastic polymer and nanotube springs provided within the elastic polymer. By using a nanotube spring-impregnated elastic polymer, the elastic support has a self-activating or self-regulating function to accommodate the pressure change in the battery when the anode is formed.

A further aspect of the present disclosure is to provide a method of forming an elastic support for a battery. The method includes forming nanotube springs on an electrode current collector, forming a prepolymer layer on the electrode current collector, and polymerizing the prepolymer layer to form an elastic polymer with the nanotube springs provided therewithin.

By forming the nanotube springs on the current collector and then forming the elastic polymer, the nanotube springs may be embedded within the elastic polymer on the current collector. In addition, by providing nanotube springs within the elastic polymer layer, the nanotube springs can be contracted or compressed and the elastic polymer layer can become softer to accommodate the change in expansion and pressure when an anode layer is formed during charging. In addition, because the nanotube springs and elastic polymer layer can be decompressed and expand again when the anode layer goes away during discharging, issues with contact between the layers of the battery after discharge can be prevented, thereby improving the overall cycle life and battery performance.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1A:
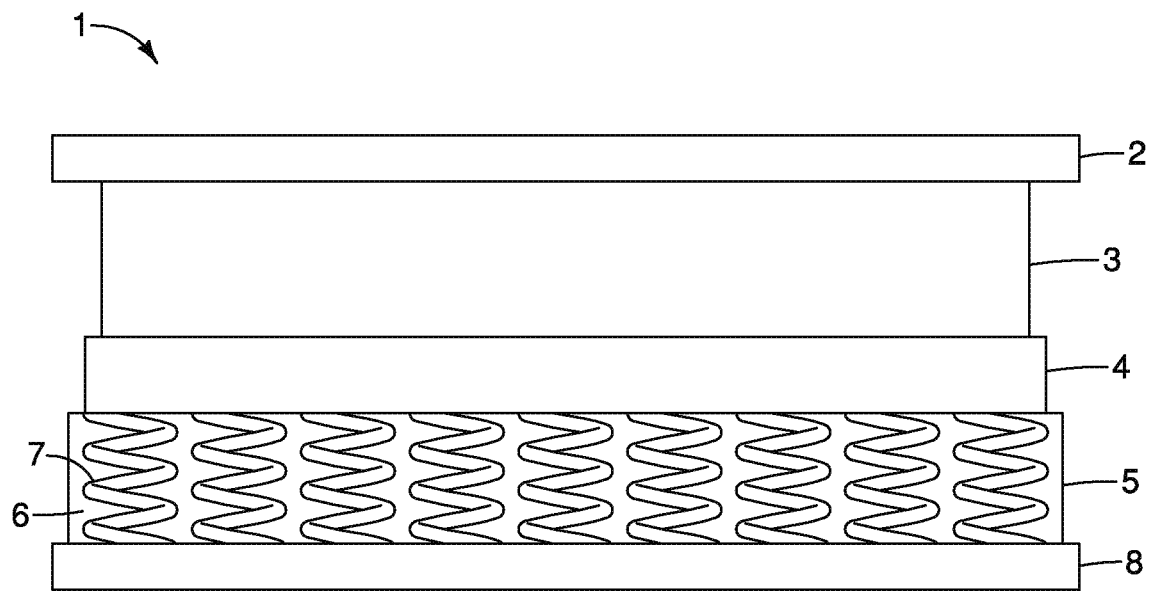
FIG. 1(a) is a cross sectional view of a solid state battery before charging according to a first embodiment.

Referring initially to FIG. 1(a), a solid-state battery 1 is illustrated before charging in accordance with a first embodiment. The solid-state battery 1 includes a cathode current collector 2, a cathode 3, an electrolyte 4, an elastic support 5 and an anode current collector 8. The solid-state battery 1 is an anode-free solid-state battery before charging and can be incorporated in a vehicle, a mobile device, a laptop computer or other suitable personal electronic device. However, it should be understood that the elastic support 5 may also be used in a solid-state battery that is not anode-free. The solid-state battery 1 is preferably an all-solid-state battery.

The cathode current collector 2 is formed of any suitable metal material, such as aluminum or copper, preferably aluminum. The cathode current collector 2 has a thickness ranging from 10 µm to 20 µm, preferably 10 µm.

The cathode 3 includes a cathode active material and a catholyte material. The cathode active material is any suitable cathode active material that is compatible with a solid electrolyte. For example, the cathode active material may be a lithium transition metal oxide such as NMC or lithium cobalt oxide, lithium phosphate, lithium iron phosphate or a mixture thereof. The cathode active material is formed of particles having a diameter of approximately 15 nm to 5 µm. The catholyte material is any suitable lithium-ion conductive solid electrolyte material, such as a sulfide-based solid electrolyte.

The cathode 3 may also include a binder and/or an electrically conductive additive. The binder may be any suitable electrode binder material. For example, the binder may include polyvinylidene fluoride, polytetrafluoroethylene, styrene-butadiene rubber, a cellulose material or any combination thereof. The electrically conductive additive may be any suitable sacrificial electrode additive, such as a material that acts as an additional source of lithium ions. For example, the electrically conductive additive can be a carbon material. The cathode 3 has a thickness of approximately 50 µm to 150 µm, preferably 100 µm.

The cathode 3 includes at least 80 percent by weight of the cathode active material and up to 15 percent by weight of the catholyte material. The cathode 3 also includes up to five percent by weight of the additive plus the binder. For example, the cathode 3 may include approximately two percent by weight of the additive and approximately three percent by weight of the binder. The weight percentage values described above are relative to a total weight of the cathode 3.

The electrolyte 4 is formed of a solid electrolyte material. The solid electrolyte material is any suitable lithium-ion conductive solid electrolyte for a solid-state battery. For example, the lithium-ion conductive solid electrolyte can be a sulfide-based solid electrolyte, such as $Li_6PS_5Cl$, an oxide solid electrolyte, or a hybrid solid electrolyte that includes a sulfide-based solid electrolyte and polyethylene oxide ("PEO") based polymer. The electrolyte 4 has a thickness of approximately 20 µm to 30 µm.

As shown in FIG. 1(a), the elastic support 5 includes an elastic polymer layer 6 and a plurality of nanosprings 7 embedded or provided within the elastic polymer layer 6. The elastic polymer layer 6 is formed of any suitable polymer material having an elasticity such that the amount of elastic strain is similar to that of the plurality of nanosprings 7. For example, the elastic polymer layer 6 is formed of a polymer that is crosslinked, preferably polyacrylate or polymethyl methacrylate. The elastic properties of the elastic polymer layer 6 can be adjusted by changing the crosslinking density of the polymer. The elastic polymer layer 6 is preferably formed from a prepolymer having a low molecular weight of 500 MW or less that is crosslinkable and contains double bounds. The elastic polymer layer 6 has a thickness of approximately 3 μm to 30 μm.

Figure 1B:
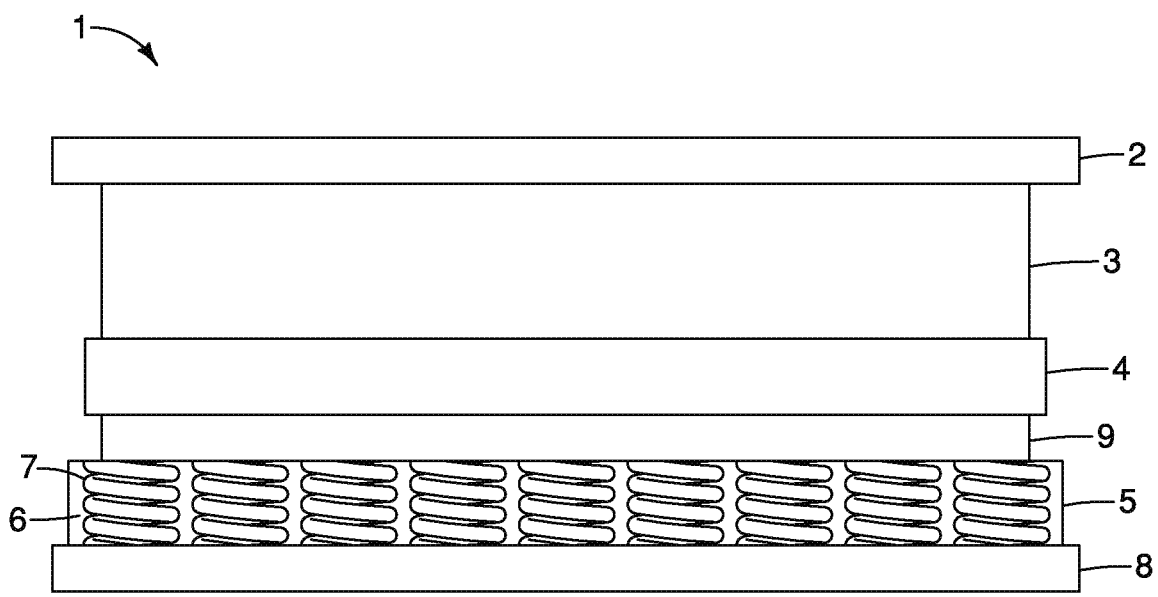
FIG. 1(b) is a cross sectional view of the solid state battery after charging according to the first embodiment.

The elastic support 5 also includes a plurality of nanosprings 7 provided or embedded within the elastic polymer layer 6. As shown in FIG. 1(*a*), the nanosprings 7 are spaced apart from each other at approximately regular intervals on the top surface of the anode current collector 8. However, it should be understood that the nanosprings 7 may be formed on the top surface of the anode current collector 8 in any suitable manner, including being formed in an irregular pattern or being spaced apart from each other at various distances.

The nanosprings 7 are formed of any suitable conductive material. For example, the nanosprings 7 are formed of a carbon material or a copper material, such as carbon nanotubes, carbon springs, copper nanotubes, copper springs and any combination thereof. The nanosprings 7 each have a spiral coiled shape or a helical shape as shown in FIG. 1(*a*). However, it should be understood that the nanosprings 7 may have any suitable shape as long as the nanosprings 7 have a spring constant ranging from approximately 10 nN/nm to 40 nN/nm.

The nanosprings 7 have a diameter of approximately 0.5 nm to 200 nm. It should be understood that the spring constant of the nanosprings 7 can be adjusted by changing the diameter of the nanosprings 7. The nanosprings 7 have a length such that they can protrude from the elastic polymer layer 6 by as much as approximately 2 μm. For example, the nanosprings 7 each have a length of approximately 10 nm to 32 μm. By including the nanosprings 7 in the elastic polymer layer 6, the nanotube springs 7 can be contracted or compressed and the elastic polymer layer 6 can become softer to accommodate the change in expansion and pressure when an anode 9 is formed during charging, thereby providing a self-activating or self-regulating functionality for the elastic support 5.

As shown in FIG. 1(*a*), the elastic support 5, including the elastic polymer layer 6 and the plurality of nanosprings 7, is provided on a top surface of the anode current collector 8 facing an interior of the solid-state battery 1. However, it should be understood that the elastic support 5 may alternatively be formed on the bottom surface of the anode current collector 8 that faces an exterior of the solid-state battery 1. Alternatively, or in addition thereto, an elastic support including an elastic polymer layer and a plurality of nanosprings embedded therein may also be formed on a surface of the cathode current collector 2. The anode current collector 8 is formed of any suitable metal material, such as aluminum or copper, preferably copper. The anode current collector 8 has a thickness ranging from 10 μm to 20 μm, preferably 10 μm.

As shown in FIG. 1(*b*), the cathode current collector 2, the cathode 3, the electrolyte 4 and the anode current collector 8 are all at least substantially the same after charging, i.e., they have the same thickness and shape, as before charging.

However, after charging, the elastic support 5 is compressed as shown in FIG. 1(*b*) compared to the elastic support 5 before charging as shown in FIG. 1(*a*). In other words, the elastic support 5 has a smaller thickness after charging than before charging. In addition, the elastic polymer layer 6 and the nanosprings 7 are compressed and have a smaller thickness and length, respectively, after charging than before charging. This change in the elastic support 5 after charging is due to formation of the anode 9 during charging.

Although the solid-state battery 1 is anode-free before charging as shown in FIG. 1(*a*), the anode 9 is formed during charging such that it is disposed on the top surface of the anode current collector 8 between the anode current collector 8 and the elastic support 5. The anode 9 is formed during charging by precipitation of lithium from the intercalated lithium in the cathode active material in the cathode 3. Therefore, the anode 9 is formed entirely of lithium metal or a lithium alloy, such as a lithium-silver alloy. The anode 9 has a thickness of approximately 20 μm to 40 μm, preferably 30 μm. The increase in thickness or expansion of the solid-state battery 1 during charging due to formation of the anode 9 is accommodated by providing the self-activating elastic support 5 with an elastic polymer layer 6 and nanosprings 7, which are both compressed during formation of the anode 9, FIG. 2(*a*) shows a solid-state battery 10 before charging in accordance with a second embodiment. Like the solid-state battery 1 of the first embodiment, the solid-state battery 10 is an anode-free solid-state battery before charging and can be incorporated in a vehicle, a mobile device, a laptop computer or other suitable personal electronic device. The solid-state battery 10 is preferably an all-solid-state battery. The solid-state battery 10 includes an anode current collector 11, an electrolyte 12, a cathode 13, an elastic support 14 and a cathode current collector 18. Although the solid-state battery 10 is an anode-free solid-state battery 10, it should be understood that the elastic support 14 may also be used in a solid-state battery that is not anode-free.

The anode current collector 11 is formed of any suitable metal material, such as aluminum or copper, preferably copper. The anode current collector 11 has a thickness ranging from 10 μm to 20 μm, preferably 10 μm.

The electrolyte 12 is formed of a solid electrolyte material. The solid electrolyte material is any suitable lithium-ion conductive solid electrolyte for a solid-state battery. For example, the lithium-ion conductive solid electrolyte can be a sulfide-based solid electrolyte, such as $Li_6PS_5Cl$, an oxide solid electrolyte, or a hybrid solid electrolyte that includes a sulfide-based solid electrolyte and polyethylene oxide ("PEO") based polymer. The electrolyte 12 has a thickness of approximately 20 μm to 30 μm.

The cathode 13 includes a cathode active material and a catholyte material. The cathode active material is any suitable cathode active material that is compatible with a solid electrolyte. For example, the cathode active material may be a lithium transition metal oxide such as NMC or lithium cobalt oxide, lithium phosphate, lithium iron phosphate or a mixture thereof. The cathode active material is formed of particles having a diameter of approximately 15 nm to 5 μm. The catholyte material is any suitable lithium-ion conductive solid electrolyte material, such as a sulfide-based solid electrolyte.

The cathode 13 may also include a binder and/or an electrically conductive additive. The binder may be any suitable electrode binder material. For example, the hinder may include polyvinylidene fluoride, polytetrafluoroethylene, styrene-butadiene rubber, a cellulose material or any combination thereof. The electrically conductive additive may be any suitable sacrificial electrode additive, such as a material that acts as an additional source of lithium ions. For example, the electrically conductive additive can be a carbon material. The cathode 13 has a thickness of approximately 50 μm to 150 μm, preferably 100 μm.

The cathode 13 includes at least 80 percent by weight of the cathode active material and up to 15 percent by weight of the catholyte material. The cathode 13 also includes up to five percent by weight of the additive plus the binder. For example, the cathode 13 may include approximately two percent by weight of the additive and approximately three percent by weight of the binder. The weight percentage values described above are relative to a total weight of the cathode 13.

Figure 2A:
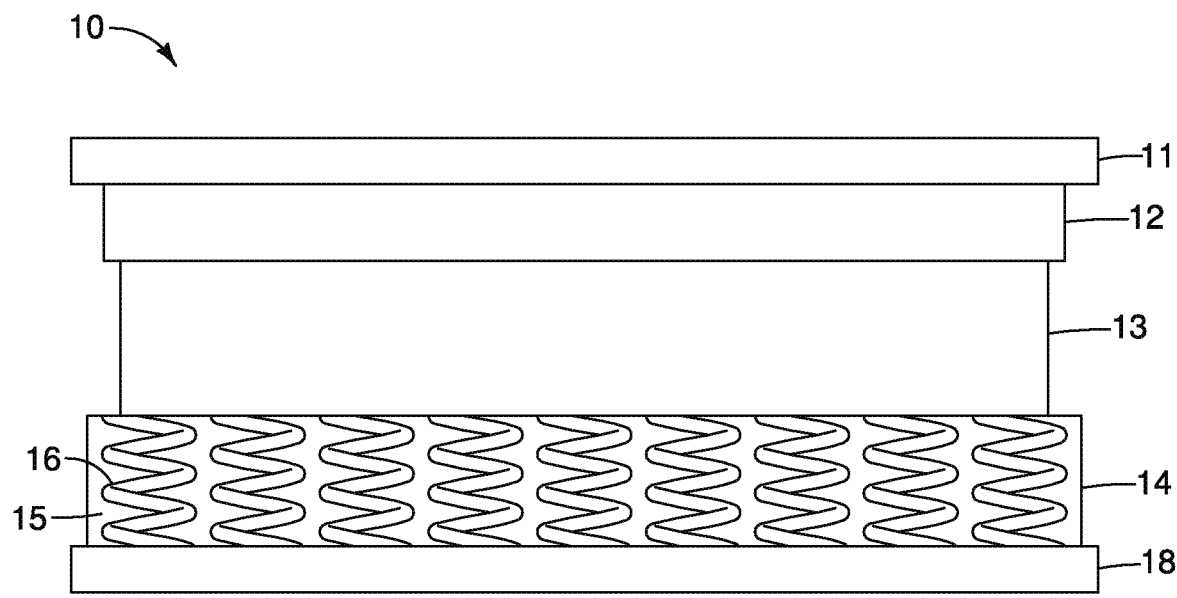
FIG. 2(a) is a cross sectional view of a solid state battery before charging according to a second embodiment.

As shown in FIG. 2(a), the elastic support 14 includes an elastic polymer layer 15 and a plurality of nanosprings 16 embedded or provided within the elastic polymer layer 15. The elastic polymer layer 15 is formed of any suitable polymer material having an elasticity such that the amount of elastic strain is similar to that of the plurality of nanosprings 16. For example, the elastic polymer layer 15 is formed of a polymer that is crosslinked, preferably polyacrylate or polymethyl methacrylate. The elastic properties of the elastic polymer layer 15 can be adjusted by changing the crosslinking density of the polymer. The elastic polymer layer 15 is preferably formed from a prepolymer having a low molecular weight of 500 MW or less that is crosslinkable and contains double bounds. The elastic polymer layer 15 has a thickness of approximately 3 μm to 30 μm.

The elastic support 14 also includes a plurality of nanosprings 16 provided or embedded within the elastic polymer layer 15. As shown in FIG. 2(a), the nanosprings 16 are spaced apart from each other at approximately regular intervals on the top surface of the cathode current collector 18. However, it should be understood that the nanosprings 16 may be formed on the top surface of the cathode current collector 18 in any suitable manner, including being formed in an irregular pattern or being spaced apart from each other at various distances.

The nanosprings 16 are formed of any suitable conductive material. For example, the nanosprings 16 are formed of a carbon material or a copper material, such as carbon nanotubes, carbon springs, copper nanotubes, copper springs and any combination thereof. The nanosprings 16 each have a spiral coiled shape or a helical shape as shown in FIG. 2(a). However, it should be understood that the nanosprings 16 may have any suitable shape as long as the nanosprings 16 have a spring constant ranging from approximately 10 nN/nm to 40 nN/nm.

The nanosprings 16 have a diameter of approximately 0.5 nm to 200 nm. It should be understood that the spring constant of the nanosprings 16 can be adjusted by changing the diameter of the nanosprings 16. The nanosprings 16 have a length such that they protrude from the elastic polymer layer 15 by as much as approximately 2 μm. For example, the nanosprings 16 each have a length of approximately 10 nm to 32 μm. By including the nanosprings 16 in the elastic polymer layer 15, the nanotube springs 16 can be contracted or compressed and the elastic polymer layer 15 can become softer to accommodate the change in expansion and pressure when an anode 19 is formed during charging, thereby providing a self-activating or self-regulating functionality for the elastic support 14.

As shown in FIG. 2(a), the elastic support 14, including the elastic polymer layer 15 and the plurality of nanosprings 16, is provided on a top surface of the cathode current collector 18 facing an interior of the solid-state battery 10. However, it should be understood that the elastic support 14 may alternatively be formed on the bottom surface of the cathode current collector 18 that faces an exterior of the solid-state battery 10. Alternatively, or in addition thereto, an elastic support including an elastic polymer layer and a plurality of nanosprings embedded therein may also be formed on a surface of the anode current collector 11. The cathode current collector 18 is formed of any suitable metal material, such as aluminum or copper, preferably aluminum. The cathode current collector 18 has a thickness ranging from 10 μm to 20 μm, preferably 10 μm.

Figure 2B:
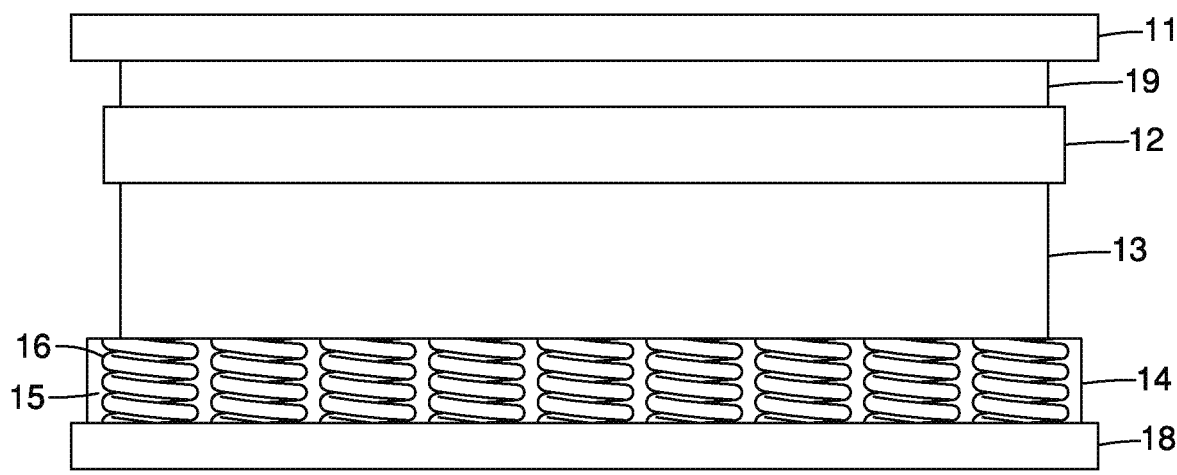
FIG. 2(b) is a cross sectional view of the solid state battery after charging according to the second embodiment.

As shown in FIG. 2(b), the anode current collector 11, the electrolyte 12, the cathode 13 and the cathode current collector 18 are all at least substantially the same after charging, i.e., they have the same thickness and shape, as before charging.

However, after charging, the elastic support 14 is compressed as shown in FIG. 2(b) compared to the elastic support 14 before charging as shown in FIG. 2(a). In other words, the elastic support 14 has a smaller thickness after charging than before charging. In addition, the elastic polymer layer 15 and the nanosprings 16 are compressed and have a smaller thickness and length, respectively, after charging than before charging. This change in the elastic support 14 after charging is due to formation of the anode 19 during charging.

Although the solid-state battery 10 is anode-free before charging as shown in FIG. 2(a), the anode 19 is formed during charging such that it is disposed on the bottom surface of the anode current collector 11 between the anode current collector 11 and the solid electrolyte 12. The anode 19 is formed during charging by precipitation of lithium from the intercalated lithium in the cathode active material in the cathode 13. Therefore, the anode 19 is formed entirely of lithium metal or a lithium alloy, such as a lithium-silver alloy. The anode 19 has a thickness of approximately 20 μm to 40 μm, preferably 30 μm. The increase in thickness or expansion of the solid-state battery 10 during charging due to formation of the anode 19 is accommodated by providing the self-activating elastic support 14 with an elastic polymer layer 15 and nanosprings 16, which are both compressed during formation of the anode 19.

Figure 3A:
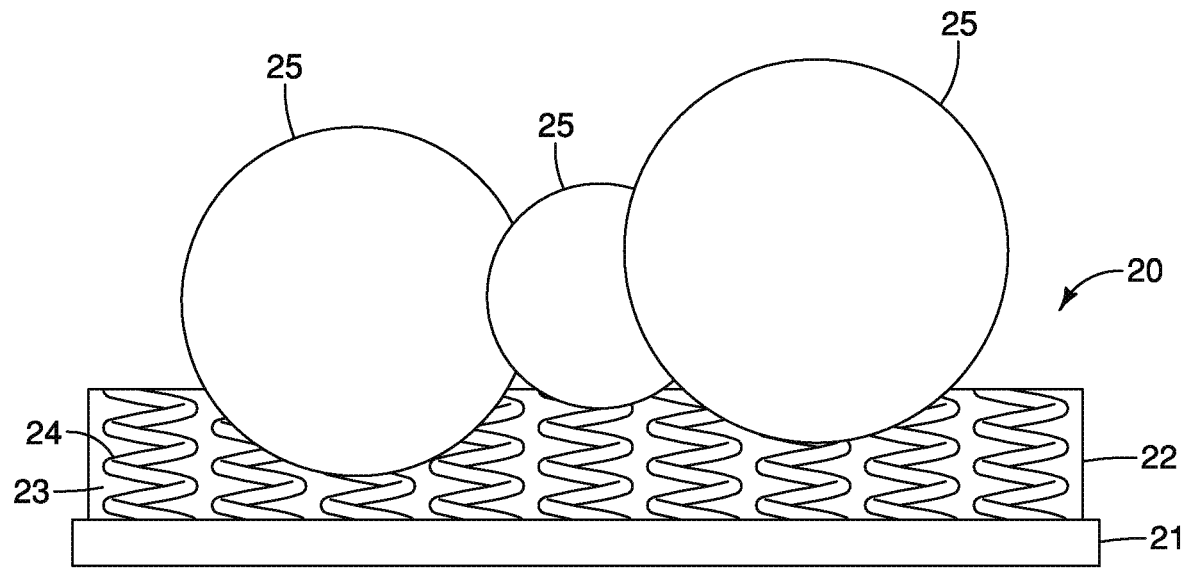
FIG. 3(a) is a cross sectional view of an elastic support structure of a solid state battery before charging according to a third embodiment.

FIG. 3(a) shows an elastic support structure 20 of a solid-state battery before charging in accordance with a third embodiment. Like the solid-state battery of the first and second embodiments, the solid-state battery of the third embodiment is an anode-free solid-state battery before charging and can be incorporated in a vehicle, a mobile device, a laptop computer or other suitable personal electronic devices.

As shown in FIG. 3(a), the elastic support structure 20 of the solid-state battery includes a cathode current collector 21 and an elastic support 22 formed on the cathode current collector 21. The cathode current collector 21 is formed of any suitable metal material, such as aluminum or copper. The cathode current collector 21 is preferably formed of aluminum. The cathode current collector 21 has a thickness ranging from 10 μm to 20 μm, preferably 10 μm.

The elastic support 22 is formed on a top surface of the cathode current collector 21. The elastic support 22 includes an elastic polymer layer 23 and a plurality of nanosprings 24 embedded or provided within the elastic polymer layer 23. The elastic polymer layer 23 is formed of any suitable polymer material having an elasticity such that the amount of elastic strain is similar to that of the plurality of nanosprings 24. For example, the elastic polymer layer 23 is formed of a polymer that is crosslinked, preferably polyacrylate or polymethyl methacrylate. The elastic properties of the elastic polymer layer 23 can be adjusted by changing the crosslinking density of the polymer. The elastic polymer layer 23 is preferably formed from a prepolymer having a low molecular weight of 500 MW or less that is crosslinkable and contains double bounds. The elastic polymer layer 23 has a thickness of approximately 3 μm to 30 μm. Although the elastic support 22 of the third embodiment is part of an anode-free solid-state battery, it should be understood that the elastic support 22 may also be used in a solid-state battery that is not anode-free.

The elastic support 22 also includes a plurality of nanosprings 24 provided or embedded within the elastic polymer layer 23. As shown in FIG. 3(a), the nanosprings 24 are spaced apart from each other at approximately regular intervals on the top surface of the cathode current collector 21. However, it should be understood that the nanosprings 24 may be formed on the top surface of the cathode current collector 21 in any suitable manner, including being formed in an irregular pattern or being spaced apart from each other at various distances.

The nanosprings 24 are formed of any suitable conductive material. For example, the nanosprings 24 are formed of a carbon material or a copper material, such as carbon nanotubes, carbon springs, copper nanotubes, copper springs and any combination thereof. The nanosprings 24 each have a spiral coiled shape or a helical shape as shown in FIG. 3(a). However, it should be understood that the nanosprings 24 may have any suitable shape as long as the nanosprings 24 have a spring constant ranging from approximately 10 nN/nm to 40 nN/nm.

The nanosprings 24 have a diameter of approximately 0.5 nm to 200 nm. It should be understood that the spring constant of the nanosprings 24 can be adjusted by changing the diameter of the nanosprings 24. The nanosprings 24 have a length such that they protrude from the elastic polymer layer 23 by as much as approximately 2 μm. For example, the nanosprings 24 each have a length of approximately 10 nm to 32 μm. By including the nanosprings 24 in the elastic polymer layer 23, the nanotube springs 24 can be contracted or compressed and the elastic polymer layer 23 can become softer to accommodate the change in expansion and pressure when an anode is formed during charging, thereby providing a self-activating or self-regulating functionality for the elastic support 22.

As shown in FIG. 3(a), the elastic support 22, including the elastic polymer layer 23 and the plurality of nanosprings 24, is provided on a top surface of the cathode current collector 21 facing an interior of the solid-state battery. However, it should be understood that the elastic support 22 may alternatively be formed on the bottom surface of the current collector 21 that faces an exterior of the solid-state battery. Alternatively, or in addition thereto, an elastic support including an elastic polymer layer and a plurality of nanosprings embedded therein may also be formed on a surface of the anode current collector in the solid-state battery.

FIG. 3(a) also shows cathode active material particles 25 in contact with the elastic support 22. The cathode active material particles 25 are formed of any suitable cathode active material that is compatible with a solid electrolyte. For example, the cathode active material particles 25 may be formed of a lithium transition metal oxide such as NMC or lithium cobalt oxide, lithium phosphate, lithium iron phosphate or a mixture thereof.

Figure 3B:
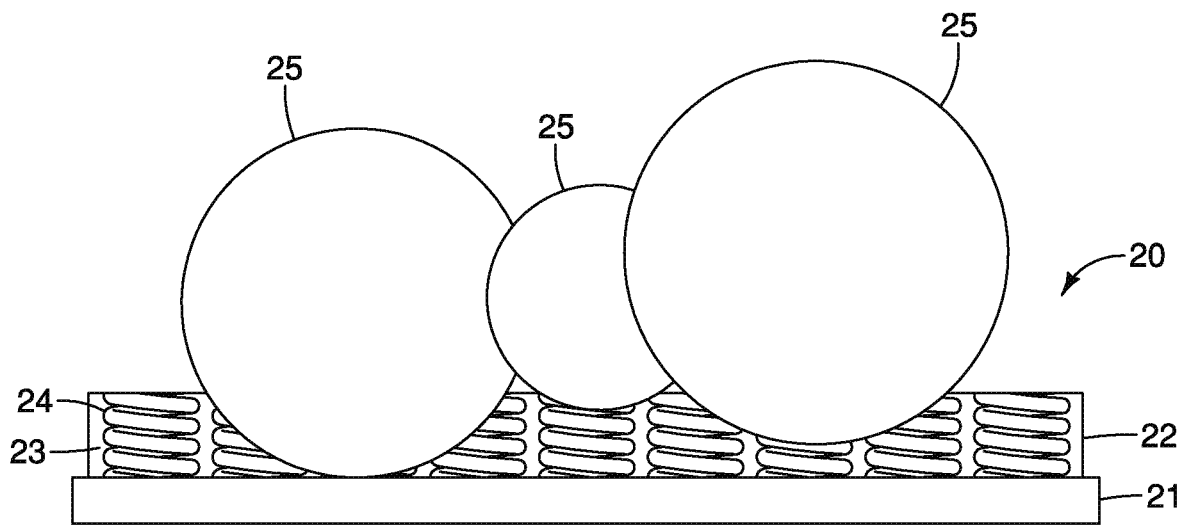
FIG. 3(b) is a cross sectional view of the elastic support structure of the solid state battery after charging according to the third embodiment.

As shown in FIG. 3(b), the cathode current collector 21 and the cathode active material particles 25 are all at least substantially the same after charging, i.e., they have the same thickness and shape, as before charging.

However, after charging, the elastic support 22 is compressed as shown in FIG. 3(b) compared to the elastic support 22 before charging as shown in FIG. 3(a). In other words, the elastic support 22 has a smaller thickness after charging than before charging. In addition, the elastic polymer layer 23 and the nanosprings 24 are compressed and have a smaller thickness and length, respectively, after charging than before charging. This change in the elastic support 22 after charging is due to formation of an anode during charging.

Figure 4A:
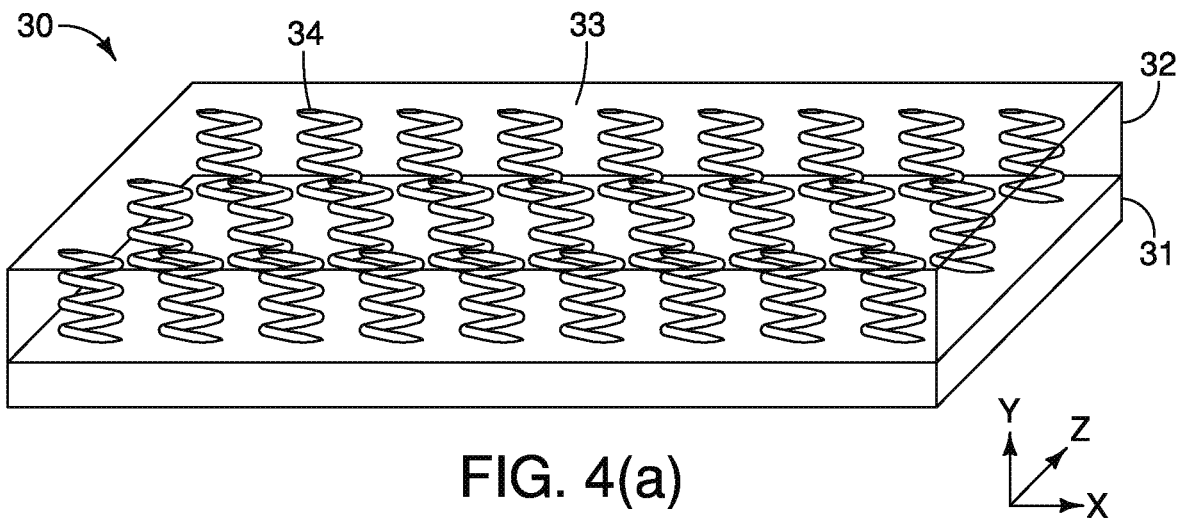
FIG. 4(a) is a perspective view of an elastic support structure of a solid state battery according to a fourth embodiment.

FIG. 4(a) shows an elastic support structure 30 of a solid-state battery in accordance with a fourth embodiment. Like the solid-state battery of the first and second embodiments, the solid-state battery of the fourth embodiment is an anode-free solid-state battery before charging and can be incorporated in a vehicle, a mobile device, a laptop computer or other suitable personal electronic devices.

As shown in FIG. 4(a), the elastic support structure 30 of the solid-state battery includes an electrode current collector 31. The electrode current collector 31 is formed of any suitable metal material, such as aluminum or copper. The electrode current collector 31 has a thickness ranging from 60 μm to 100 μm, preferably 60 μm.

The elastic support structure 30 of the solid-state battery also includes an elastic support 32 formed on a top surface of the electrode current collector 31. The elastic support 32 includes an elastic polymer layer 33 and a plurality of nanosprings 34 embedded or provided within the elastic polymer layer 33. The elastic polymer layer 33 is formed of any suitable polymer material having an elasticity such that the amount of elastic strain is similar to that of the plurality of nanosprings 34. For example, the elastic polymer layer 33 is formed of a polymer that is crosslinked, preferably a polyacrylamide. The elastic properties of the elastic polymer layer 33 can be adjusted by changing the crosslinking density of the polymer. The elastic polymer layer 33 is preferably formed from a prepolymer having a low molecular weight of 500 MW or less that is crosslinkable and contains double bounds. The elastic polymer layer 33 has a thickness of approximately 3 μm to 30 μm.

Figure 4B:
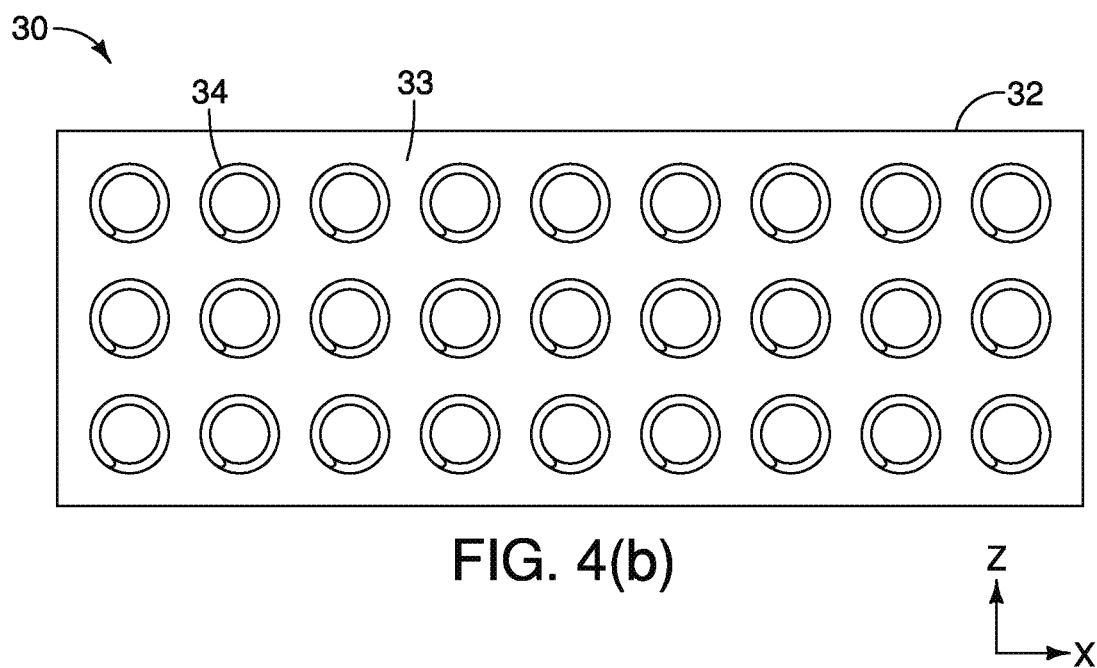
FIG. 4(b) is a top view of the elastic support structure of the solid state battery according to the fourth embodiment.

As shown in FIGS. 4(a) and 4(b), the nanosprings 34 are spaced apart from each other at approximately regular intervals in both the X and Z directions on the top surface of the electrode current collector 31. However, it should be understood that the nanosprings 34 may be formed on the top surface of the electrode current collector 31 in any suitable manner, including being formed in an irregular pattern or being spaced apart from each other at various distances in the X and/or Z directions.

The nanosprings 34 are formed of any suitable conductive material. For example, the nanosprings 34 are formed of a carbon material or a copper material, such as carbon nanotubes, carbon springs, copper nanotubes, copper springs and any combination thereof. The nanosprings 34 each have a spiral coiled shape or a helical shape as shown in FIG. 4(a). However, it should be understood that the nanosprings 34 may have any suitable shape as long as the nanosprings 34 have a spring constant ranging from approximately 10 nN/nm to 40 nN/nm.

The nanosprings 34 have a diameter of approximately 0.5 nm to 200 nm. It should be understood that the spring constant of the nanosprings 34 can be adjusted by changing the diameter of the nanosprings 34. The nanosprings 34 have a length such that they protrude from the elastic polymer layer 33 by as much as approximately 2 μm. For example, the nanosprings 34 each have a length of approximately 10 nm to 32 μm. By including the nanosprings 34 in the elastic polymer layer 33, the nanotube springs 34 can be contracted or compressed and the elastic polymer layer 33 can become softer to accommodate the change in expansion and pressure when an anode is formed during charging of a solid-state battery, thereby providing a self-activating or self-regulating functionality for the elastic support 32.

Figure 5A:
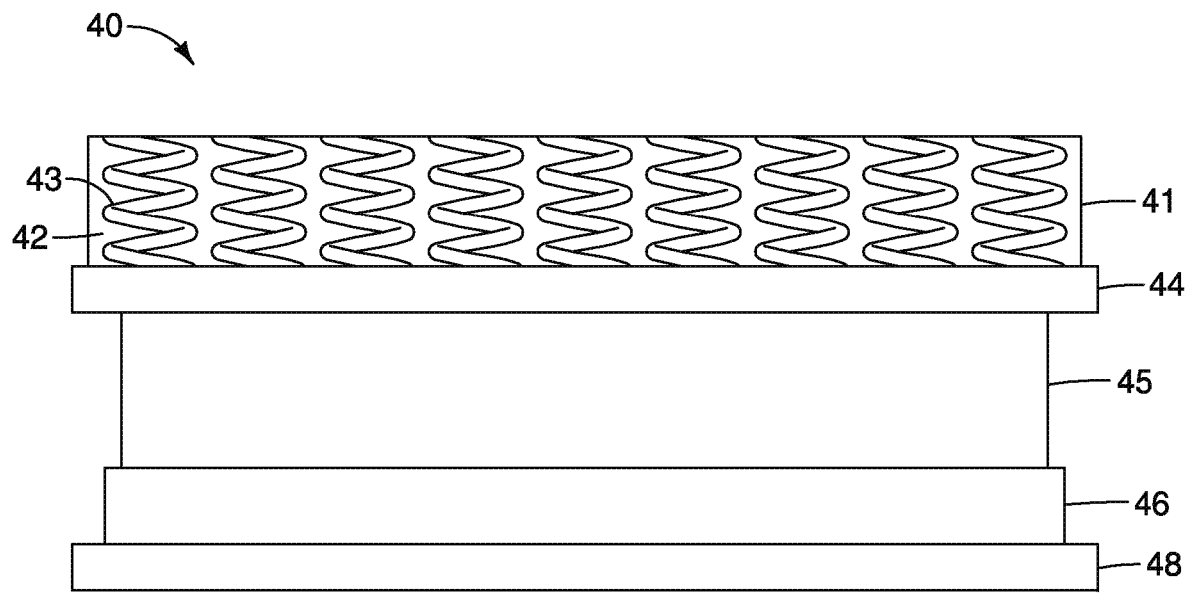
FIG. 5(a) is a cross sectional view of a solid state battery before charging according to a fifth embodiment.

FIG. 5(a) shows a solid-state battery 40 before charging in accordance with a fifth embodiment. Like the solid-state battery 1 of the first embodiment and the solid-state battery 10 of the second embodiment, the solid-state battery 40 is an anode-free solid-state battery before charging and can be incorporated in a vehicle, a mobile device, a laptop computer or other suitable personal electronic device. The solid-state battery 40 is preferably an all-solid-state battery. The solid-state battery 40 includes an elastic support 41, a cathode current collector 44, a cathode 45, an electrolyte 46 and an anode current collector 48. Although the solid-state battery 40 is an anode-free solid-state battery 10, it should be understood that the elastic support 41 may also be used in a solid-state battery that is not anode-free.

As shown in FIG. 5(a), the elastic support 41 includes an elastic polymer layer 42 and a plurality of nanosprings 43 embedded or provided within the elastic polymer layer 42. The elastic polymer layer 42 is formed of any suitable polymer material having an elasticity such that the amount of elastic strain is similar to that of the plurality of nanosprings 43. For example, the elastic polymer layer 42 is formed of a polymer that is crosslinked, preferably polyacrylate or polymethyl methacrylate. The elastic properties of the elastic polymer layer 42 can be adjusted by changing the crosslinking density of the polymer. The elastic polymer layer 42 is preferably formed from a prepolymer having a low molecular weight of 500 MW or less that is crosslinkable and contains double bounds. The elastic polymer layer 42 has a thickness of approximately 3 μm to 30 μm.

As shown in FIG. 5(a), the nanosprings 43 are spaced apart from each other at approximately regular intervals on the top surface of the cathode current collector 44. However, it should be understood that the nanosprings 43 may be formed on the top surface of the cathode current collector 44 in any suitable manner, including being formed in an irregular pattern or being spaced apart from each other at various distances.

The nanosprings 43 are formed of any suitable conductive material. For example, the nanosprings 43 are formed of a carbon material or a copper material, such as carbon nanotubes, carbon springs, copper nanotubes, copper springs and any combination thereof. The nanosprings 43 each have a spiral coiled shape or a helical shape as shown in FIG. 5(a). However, it should be understood that the nanosprings 43 may have any suitable shape as long as the nanosprings 43 have a spring constant ranging from approximately 10 nN/nm to 40 nN/nm.

The nanosprings 43 have a diameter of approximately 0.5 nm to 200 nm. It should be understood that the spring constant of the nanosprings 43 can be adjusted by changing the diameter of the nanosprings 43. The nanosprings 43 have a length such that they protrude from the elastic polymer layer 42 by as much as approximately 2 μm. For example, the nanosprings 43 each have a length of approximately 10 nm to 32 μm. By including the nanosprings 43 in the elastic polymer layer 42, the nanotube springs 43 can be contracted or compressed and the elastic polymer layer 42 can become softer to accommodate the change in expansion and pressure when an anode 49 is formed during charging, thereby providing a self-activating or self-regulating functionality for the elastic support 41.

As shown in FIG. 5(a), the elastic support 41, including the elastic polymer layer 42 and the plurality of nanosprings 43, is provided on a top surface of the cathode current collector 44 facing an exterior of the solid-state battery 40. However, it should be understood that the elastic support 41 may alternatively be formed on the bottom surface of the cathode current collector 44 that faces an interior of the solid-state battery 40. Alternatively, or in addition thereto, an elastic support including an elastic polymer layer and a plurality of nanosprings embedded therein may also be formed on a surface of the anode current collector 48.

The cathode current collector 44 is formed of any suitable metal material, such as aluminum or copper, preferably aluminum. The cathode current collector 44 has a thickness ranging from 10 μm to 20 μm, preferably 10 μm.

The cathode 45 includes a cathode active material and a catholyte material. The cathode active material is any suitable cathode active material that is compatible with a solid electrolyte. For example, the cathode active material may be a lithium transition metal oxide such as NMC or lithium cobalt oxide, lithium phosphate, lithium iron phosphate or a mixture thereof. The cathode active material is formed of particles having a diameter of approximately 15 nm to 5 μm. The catholyte material is any suitable lithium-ion conductive solid electrolyte material, such as a sulfide-based solid electrolyte.

The cathode 45 may also include a binder and/or an electrically conductive additive. The binder may be any suitable electrode hinder material. For example, the binder may include polyvinylidene fluoride, polytetrafluoroethylene, styrene-butadiene rubber, a cellulose material or any combination thereof. The electrically conductive additive may be any suitable sacrificial electrode additive, such as a material that acts as an additional source of lithium ions. For example, the electrically conductive additive can be a carbon material. The cathode 45 has a thickness of approximately 50 μm to 150 μm, preferably 100 μm.

The cathode 45 includes at least 80 percent by weight of the cathode active material and up to 15 percent by weight of the catholyte material. The cathode 45 also includes up to five percent by weight of the additive plus the binder. For example, the cathode 45 may include approximately two percent by weight of the additive and approximately three percent by weight of the binder. The weight percentage values described above are relative to a total weight of the cathode 45.

The electrolyte 46 is formed of a solid electrolyte material. The solid electrolyte material is any suitable lithium-ion conductive solid electrolyte for a solid-state battery. For example, the lithium-ion conductive solid electrolyte can be a sulfide-based solid electrolyte, such as $Li_6PS_5Cl$, an oxide solid electrolyte, or a hybrid solid electrolyte that includes a sulfide-based solid electrolyte and polyethylene oxide ("PEO") based polymer. The electrolyte 46 has a thickness of approximately 20 μm to 30 μm.

The anode current collector 48 is formed of any suitable metal material, such as aluminum or copper, preferably copper. The anode current collector 48 has a thickness ranging from 10 μm to 20 μm, preferably 10 μm.

Figure 5B:
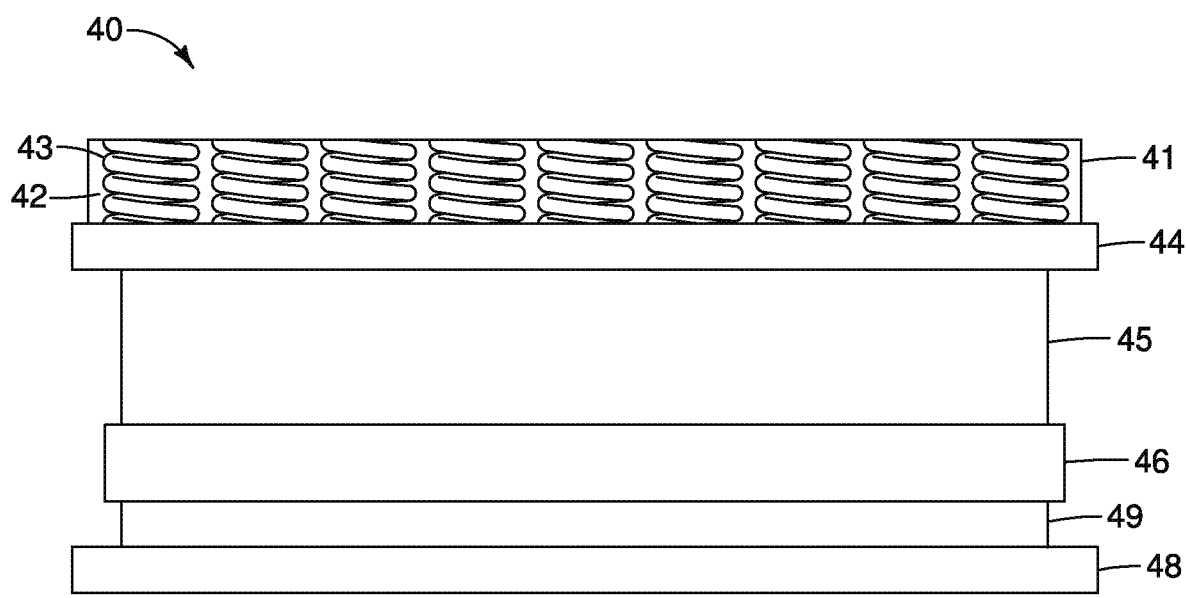
FIG. 5(b) is a cross sectional view of the solid state battery after charging according to the fifth embodiment.

As shown in FIG. 5(b), the cathode current collector 44, the cathode 45, the electrolyte 46 and the anode current collector 48 are all at least substantially the same after charging, i.e., they have the same thickness and shape, as before charging.

However, after charging, the elastic support 41 is compressed as shown in FIG. 5(b) compared to the elastic support 41 before charging as shown in FIG. 5(a). In other words, the elastic support 41 has a smaller thickness after charging than before charging. In addition, the elastic polymer layer 42 and the nanosprings 43 are compressed and have a smaller thickness and length, respectively, after charging than before charging. This change in the elastic support 41 after charging is due to formation of an anode 49 during charging.

Although the solid-state battery 40 is anode-free before charging as shown in FIG. 5(*a*), the anode 49 is formed during charging such that it is disposed on the top surface of the anode current collector 48 between the anode current collector 48 and the solid electrolyte 46. The anode 49 is formed during charging by precipitation of lithium from the intercalated lithium in the cathode active material in the cathode 45. Therefore, the anode 49 is formed entirely of lithium metal or a lithium alloy, such as a lithium-silver alloy. The anode 49 has a thickness of approximately 20 μm to 40 μm, preferably 30 μm. The increase in thickness or expansion of the solid-state battery 40 during charging due to formation of the anode 49 is accommodated by providing the self-activating elastic support 41 with an elastic polymer layer 42 and nanosprings 43, which are both compressed during formation of the anode 49, FIGS. 1(*a*)-5(*b*) all illustrate anode-free solid-state batteries. However, although not illustrated, it should be understood that the elastic support designs of FIGS. 1(*a*)-5(*b*) are all also applicable to solid-state batteries that include an anode before charging.

Figure 6:
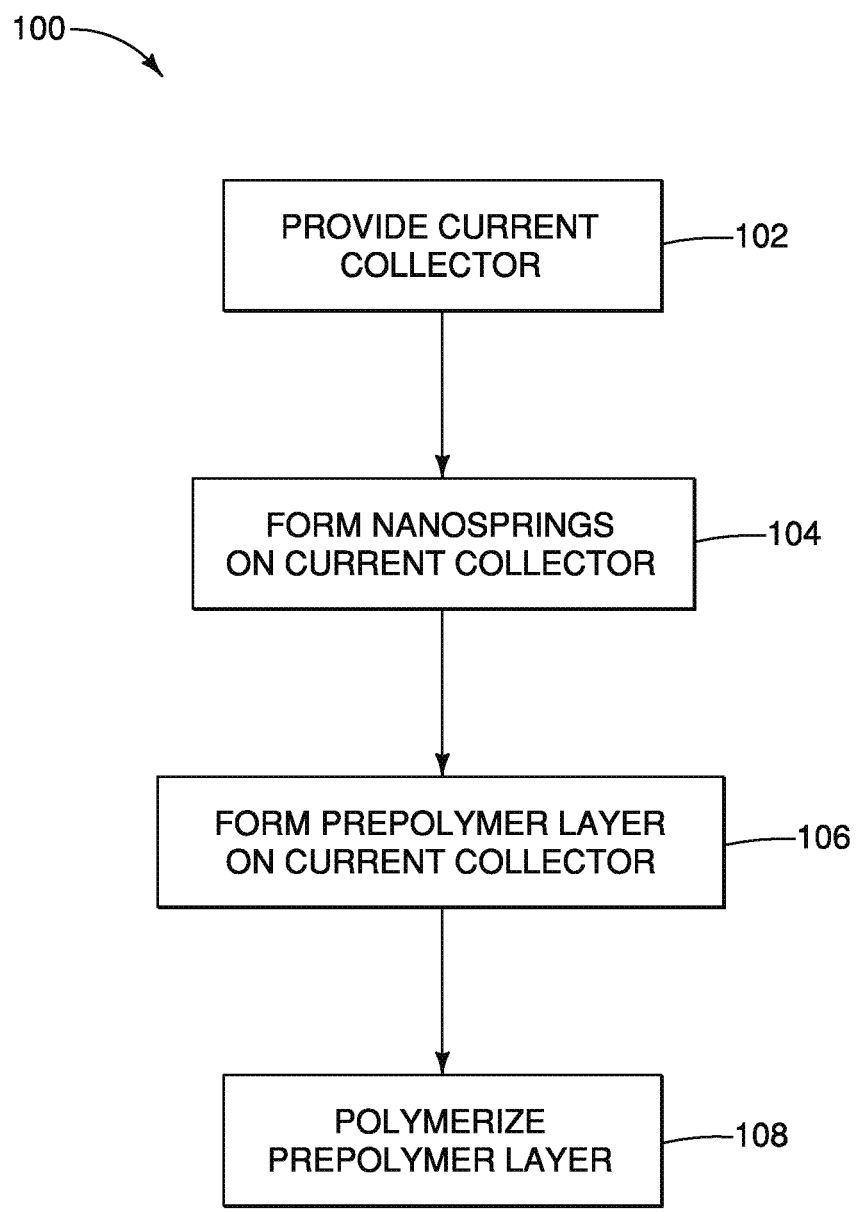
FIG. 6 is an illustrated flow chart showing a process of forming an elastic support for a solid state battery according to a sixth embodiment.

FIG. 6 illustrates a process 100 of forming an elastic support for a solid-state battery according to a sixth embodiment. The solid-state battery may be an anode-free solid state battery that is incorporated in a vehicle, a mobile device, a laptop computer or other suitable personal electronic devices.

In Step 102, a current collector is provided as a substrate on which the elastic support will be formed. The current collector may be formed of any suitable metal material, such as aluminum or copper, and has a thickness ranging from 10 μm to 20 μm, preferably 10 μm.

In Step 104, nanosprings are formed on a surface of the current collector. This can be done in any suitable manner sufficient to form nanosprings having a spring constant ranging from approximately 10 nN/nm to 40 nN/nm. For example, the nanosprings can be formed on the current collector by chemical vapor deposition while the current collector is rotating. The nanosprings are preferably formed on the current collector such that they are spaced apart from each other at approximately regular intervals on the surface of the current collector. However, it should be understood that the nanosprings may be formed in an irregular pattern or may be spaced apart from each other at various distances on the surface of the current collector.

The nanosprings are formed of any suitable conductive material. For example, the nanosprings are formed of a carbon material or a copper material, such as carbon nanotubes, carbon springs, copper nanotubes, copper springs and any combination thereof. By forming the nanosprings via chemical vapor deposition on the rotating current collector, the nanosprings can be formed to each have a spiral coiled shape or a helical shape. However, it should be understood that the nanosprings may have any suitable shape as long as the nanosprings have a spring constant ranging from approximately 10 nN/nm to 40 nN/nm. The nanosprings each have a diameter of approximately 0.5 nm to 200 nm and a length of approximately 10 μm to 32 μm.

In Step 106, a prepolymer layer is formed on the current collector so as to cover the nanosprings formed in Step 104. The prepolymer layer is formed of any suitable prepolymer having a low molecular weight of 500 MW or less that is crosslinkable and contains double bonds. For example, the prepolymer layer is formed of an acrylamide material.

In Step 108, the prepolymer layer formed in Step 106 is polymerized to form an elastic polymer layer in which the nanosprings are embedded. The elastic polymer layer has an elasticity such that the amount of elastic strain is similar to that of the nanosprings.

The elastic polymer layer is formed of a polymer that is crosslinked, preferably a polyacrylamide. The elastic polymer layer has a thickness of approximately 3 μm to 30 μm.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified teen such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A battery comprising:
   a cathode current collector;
   a cathode;
   a solid electrolyte;
   an anode current collector; and
   an elastic support provided on at least one of the cathode current collector and the anode current collector,
   the elastic support comprising an elastic polymer and nanotube springs provided within the elastic polymer.
2. The battery according to claim 1, wherein
   the nanotube springs are formed of at least one of carbon and copper.
3. The battery according to claim 1, wherein
   the elastic support is provided on a first surface of the cathode current collector between the cathode and the cathode current collector.

4. The battery according to claim 1, wherein
the elastic support is provided on a second surface of the cathode current collector, the second surface of the cathode current collector being opposite a surface of the cathode current collector on which the cathode is disposed.

5. The battery according to claim 1, wherein
the elastic support is provided on a third surface of the anode current collector between the anode current collector and the solid electrolyte.

6. The battery according to claim 1, wherein
the elastic polymer is crosslinked.

7. The battery according to claim 1, wherein
the nanotube springs each have a spiral coiled shape.

8. The battery according to claim 1, wherein
the nanotube springs protrude from the elastic polymer by approximately 2 μm.

9. The battery according to claim 1, wherein
the nanotube springs are spaced apart from each other at regular intervals on the at least one of the cathode current collector and the anode current collector.

10. The battery according to claim 1, wherein
the nanotube springs have a spring constant ranging from approximately 10 nN/nm to 40 nN/nm.

11. An elastic support comprising:
an elastic polymer; and
nanotube springs provided within the elastic polymer.

12. The elastic support according to claim 11, wherein
the nanotube springs are formed of at least one of carbon and copper.

13. The elastic support according to claim 11, wherein
the elastic polymer is crosslinked.

14. The elastic support according to claim 11, wherein
the elastic polymer is a polyacrylamide.

15. The elastic support according to claim 1, wherein
the elastic polymer is formed from a prepolymer, the prepolymer being crosslinkable and having a molecular weight of 500 MW.

16. A method of forming an elastic support for a battery, the method comprising:
forming nanotube springs on an electrode current collector;
forming a prepolymer layer on the electrode current collector; and
polymerizing the prepolymer layer to form an elastic polymer with the nanotube springs provided therewithin.

17. The method according to claim 16, wherein
the nanotube springs are formed of a conductive material.

18. The method according to claim 16, wherein
the nanotube springs are formed by deposition on the electrode current collector while the electrode current collector is rotating.

19. The method according to claim 18, wherein
the nanotube springs are deposited on the electrode current collector s are spaced apart from each other at regular intervals.

20. The method according to claim 16, wherein
the prepolymer layer is formed of a crosslinkable polymer having a molecular weight less than 500 MW.

* * * * *